United States Patent
Fudge

(10) Patent No.: US 6,205,552 B1
(45) Date of Patent: Mar. 20, 2001

(54) METHOD AND APPARATUS FOR CHECKING SECURITY VULNERABILITY OF NETWORKED DEVICES

(75) Inventor: Bob Fudge, Quinlan, TX (US)

(73) Assignee: MCI WorldCom, Inc., Jackson, MS (US)

( * ) Notice: Subject to any disclaimer, the term of this patent is extended or adjusted under 35 U.S.C. 154(b) by 0 days.

(21) Appl. No.: 09/224,132

(22) Filed: Dec. 31, 1998

(51) Int. Cl.[7] ................................................ G06F 11/30
(52) U.S. Cl. ........................................................ 713/201
(58) Field of Search .................................. 713/200, 201; 710/9, 201; 709/225, 229; 711/154, 163

(56) References Cited

U.S. PATENT DOCUMENTS

| | | | |
|---|---|---|---|
| 5,109,484 | * 4/1992 | Hughes et al. | 709/222 |
| 5,551,053 | * 8/1996 | Nadolski et al. | 710/9 |
| 5,805,801 | * 9/1998 | Holloway et al. | 713/201 |
| 5,892,903 | * 4/1999 | Klaus | 713/201 |
| 5,931,946 | * 8/1999 | Terada et al. | 713/201 |

OTHER PUBLICATIONS

Farmer et al, "The COPS Security Checker System," Purdue University Technical Report CSD–TR–993, Sep. 1991.*

Farmer et al. "SATAN–Administrator Tool for Analyzing Networks," HTML documentation files, http://www.cerf-net/satan/docs/, Dec. 1995.*

Guha et al, "Network Security via reverse engineering of TCP code: vulnerability analysis and proposed solutions," IEEE Network, pp. 40–48, Jul. 1997.*

"Internet scanner user guide," Version 5.2, pp. 1–150, 1997.*

\* cited by examiner

*Primary Examiner*—Robert W. Beausoliel, Jr.
*Assistant Examiner*—Christopher Revak

(57) ABSTRACT

Disclosed is a method of and apparatus for ascertaining system vulnerabilities of shareable devices, such as servers in a network, starting with only a list of all assigned addresses used by the system. A query is sent consecutively to each address on the list. Those addresses from which a response is not received are filtered from the list and used to generate an "unused" list. By checking the response received from the remaining addresses, non shareable devices may be ascertained and likewise filtered from the list while being used to generate a "non shareable" list. The remaining addresses thus all relate to shareable devices which can then be efficiently scanned for system vulnerabilities and a report generated as to data revealed when a report is desired.

15 Claims, 3 Drawing Sheets

METHOD AND APPARATUS FOR CHECKING SECURITY VULNERABILITY OF NETWORKED DEVICES

TECHNICAL FIELD

The present invention relates in general to communications networks and, in particular, to a method and system for checking a list of addresses within a network to verify the types of devices at each address and reporting upon which of those devices may be vulnerable to security breaches by unauthorized parties via the network.

BACKGROUND

A data network transports information among a number of various devices such as computers, display terminals, routers, printers, hubs, and so forth. Each of the devices interconnected by a given network are coupled to the network, usually through an electrical or optical connection. Furthermore, each device uses a uniform communications protocol enabling any device to transmit data to any other device. The Internet Protocol (IP) is a prevalent communications protocol that is used throughout the worldwide Internet and among self-contained corporate and private networks now known as "Intranets". Each device connected to an IP-compliant network is identified by a unique address or identification means, such as an IP address.

Although IP provides a good way to interconnect diverse types of data equipment, a problem arises as devices bearing confidential information or controlling important functions are connected to a network. Because IP is a standard protocol in such widespread use, devices attached to an IP network are significantly exposed to potential unauthorized access through the Internet and Intranets. Networked devices such as servers usually include authentication features to prevent unauthorized use of the server through the network. Any weakness in a device's security measures are likely to be found eventually and exploited by parties who desire to gain unauthorized access, alter or damage the IP device, or obtain sensitive information.

To assess the exposure of devices interfaced to a network, scanning software is commercially available that can be used to probe the IP interface of a given device and determine if it is vulnerable. Much like virus-detecting software, the IP scanning software is subject to constant updates as new vulnerability mechanisms are discovered. To test for vulnerability, scanning software operates in a processor connected to the communications network and is invoked upon an IP address of the device to be tested. The use of this scanning software is usually licensed by assessing a charge for each instance of checking an individual IP address, regardless of the outcome of the analysis.

Not all devices connected to a network offer services whereby they may be subject to exploitation. Networked input/output devices, such as display terminals and printers, typically do not pose significant security risks. Exposure analysis is more appropriate for devices like host computers (servers or other shareable devices) that offer services such as TELNET, FTP, WWW, SMTP mail, SNMP NetBIOS, and so forth. This means that exposure analysis need only be directed at addresses corresponding to shareable devices, such as servers.

For scanning to be effective, it should be repeated periodically and therefore should be done as quickly and as efficiently as possible. An internal network in a large corporation may have more than one million IP addresses. The scanning process for all of the addresses in such a list can often take days, weeks or even months depending upon the number of scanning devices used. It is costly, time consuming, and wasteful to attempt to check every possible IP address in a given domain of addresses, particularly if only a small proportion of addresses actually correspond to vulnerable devices.

A typical problem occurs when the addresses of the shareable devices are unknown and are within a large domain of IP addresses. Addresses of various devices in a system often change for many reasons. Further, it has proven difficult to accurately track address changes among devices in a network. Merely scanning a previously compiled list of shareable devices is likely to provide inaccurate or incomplete system vulnerability information. Furthermore, such a list may no longer provide accurate information as to the services provided by each shareable device. A scanning operation may be incomplete if only the services previously listed are checked for system vulnerability.

It would thus be desirable to devise a method that could significantly reduce the time and cost involved in scanning for vulnerable devices in an IP network. Further, it would be desirable to scan a given shareable device for only those services provided by that shareable device rather than taking the time to scan for all possible services. Finally, it would be desirable to obtain reports summarizing the results of such scanning in a timely fashion before damage is incurred through any security exposures.

SUMMARY OF THE INVENTION

The present invention achieves a timely and cost effective system vulnerability scanning of shareable devices by first eliminating the unused IP addresses, as well as those corresponding to non-shareable devices, and then using the scanning software only upon those devices at the addresses already identified as being shareable. The scanning can be further restricted to only the services offered by each individual shareable device. Reports may then be generated listing the devices found by IP address along with any vulnerabilities detected.

BRIEF DESCRIPTION OF THE DRAWINGS

The present invention and its advantages will be best understood by referring to the following detailed description along with the accompanying drawings wherein.

DETAILED DESCRIPTION

Figure 1:
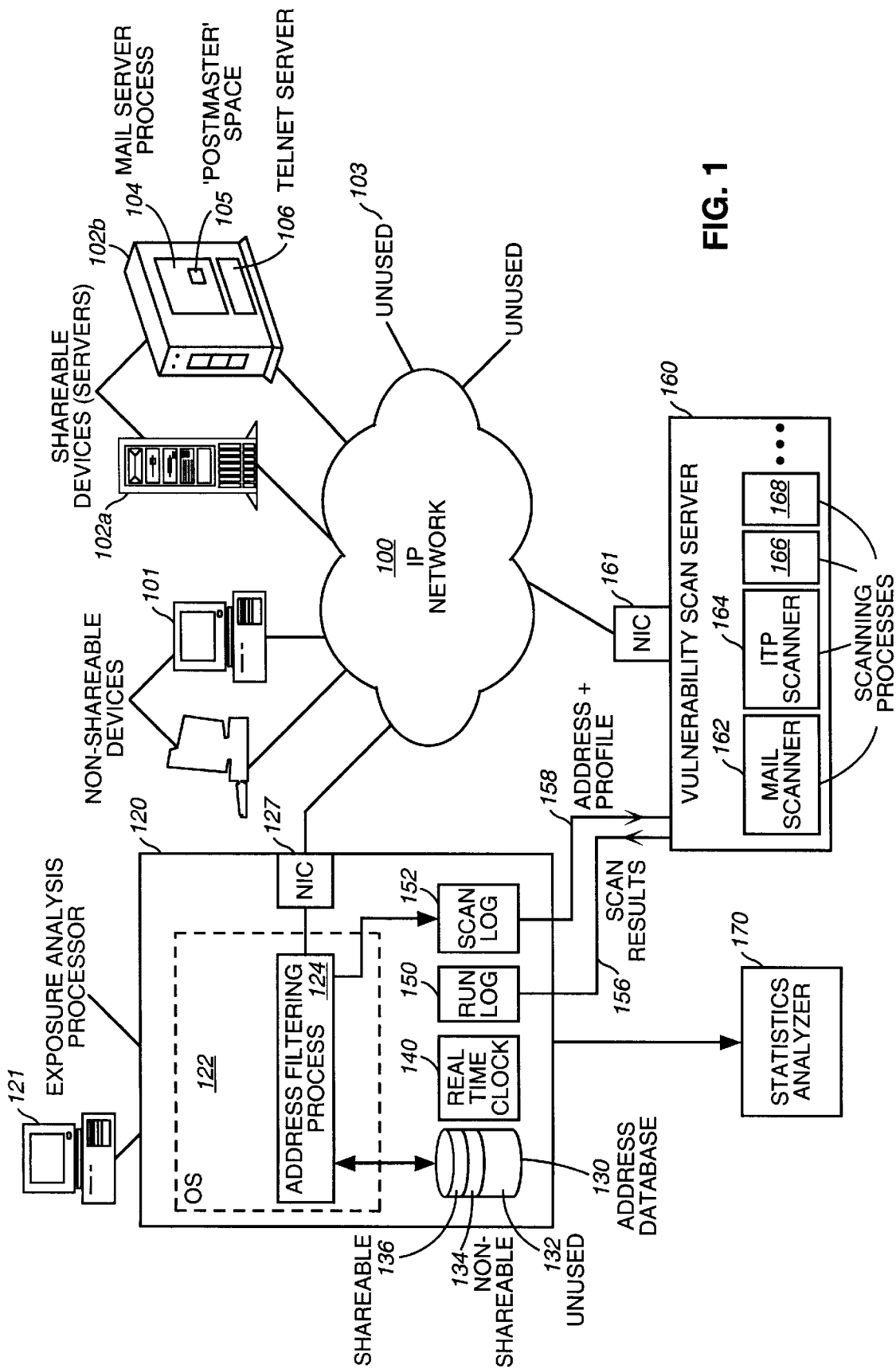
FIG. 1 is a diagram of an embodiment of the present invention coupled to a network including devices that require vulnerability testing.

Referring to FIG. 1 of the drawings, a network 100 is shown to be interconnecting numerous devices along its periphery. Each such device is connected to some unique physical port of the network, each port corresponding to some specific address within the addressing scheme of the network.

In FIG. 1, non-shareable devices 101, such as display terminals and client-only computer workstations are depicted as occupying some of the ports of network 100. Unused ports 103 of network 100 are also shown that have no equipment attached and therefore will not respond to any network signals.

Still other ports are shown to be connected to shareable devices 102a and 102b, which may be, for example, servers that perform actions or retrieve data in response to requests received via the network 100. As mentioned above, these shareable devices are the points of vulnerability whereby a malevolent party might be able to obtain sensitive data or cause damage.

For illustration, shareable device 102b is shown to comprise a mail server process 104 and a TELNET process 106. Thus, shareable device 102b is said to function as a server for other devices via network 100 and can offer at least electronic mail and TELNET services. Furthermore, a 'postmaster' space 105 within the mail server process 104 is designated as a repository for mail items, in the form of data files in storage or memory, intended for the attention of the person responsible for administering that mail server.

The description of FIG. 1 thus far has emphasized the existing network to be tested. The present invention is represented in FIG. 1 by the presence of an exposure analysis processor 120 connected to a port of the network 100 through a network interface card 127. In reduction to practice, exposure analysis processor 120 is a commonly available general-purpose computer adapted to embody the present invention as will be readily understood by those of skill in the art. Exposure analysis processor 120 executes an operating system 122 which in turn hosts the execution of an address filtering process 124 as a functional element of the present invention. A workstation 121 is included for interfacing to a user who may initiate, monitor, control, or review the analysis performed on network 100 by exposure analysis processor 120.

Address database 130 contains a list of all addresses within network 100. As shown, the contents of address database 130 are categorized into unused addresses 132, non-shareable device addresses 134, and shareable device addresses 136.

Address filtering process 124 retrieves the list of addresses from database 130 and attempts communication with each address to verify the presence of a shareable or non-shareable device. The findings are used to update database 130 as to the classification of each address.

Address filtering process 124 also determines the service interfaces found at each address and stores a profile in scan log 152.

Vulnerability scan server 160 is connected to network 100 through network interface card 161 and comprises several vulnerability scanning processes 162,164,166,168,etc. specialized for testing different service interfaces. For each address-profile combination entered into scan log 152, vulnerability scan server 160 instantiates appropriate scanning processes as indicated in the profile to begin testing the specified address. The results of vulnerability scanning are recorded in run log 150. Exposure analysis processor 120 also includes a real-time clock 140 as a reference so that all entries in the run log 150 and scan log 152 include an accurate date and time of entry.

Statistics analyzer 170 is shown in FIG. 1 as a separate processor for generally determining patterns and trends over a series of exposure analysis passes or collecting scan results from multiple networks.

Figure 2:
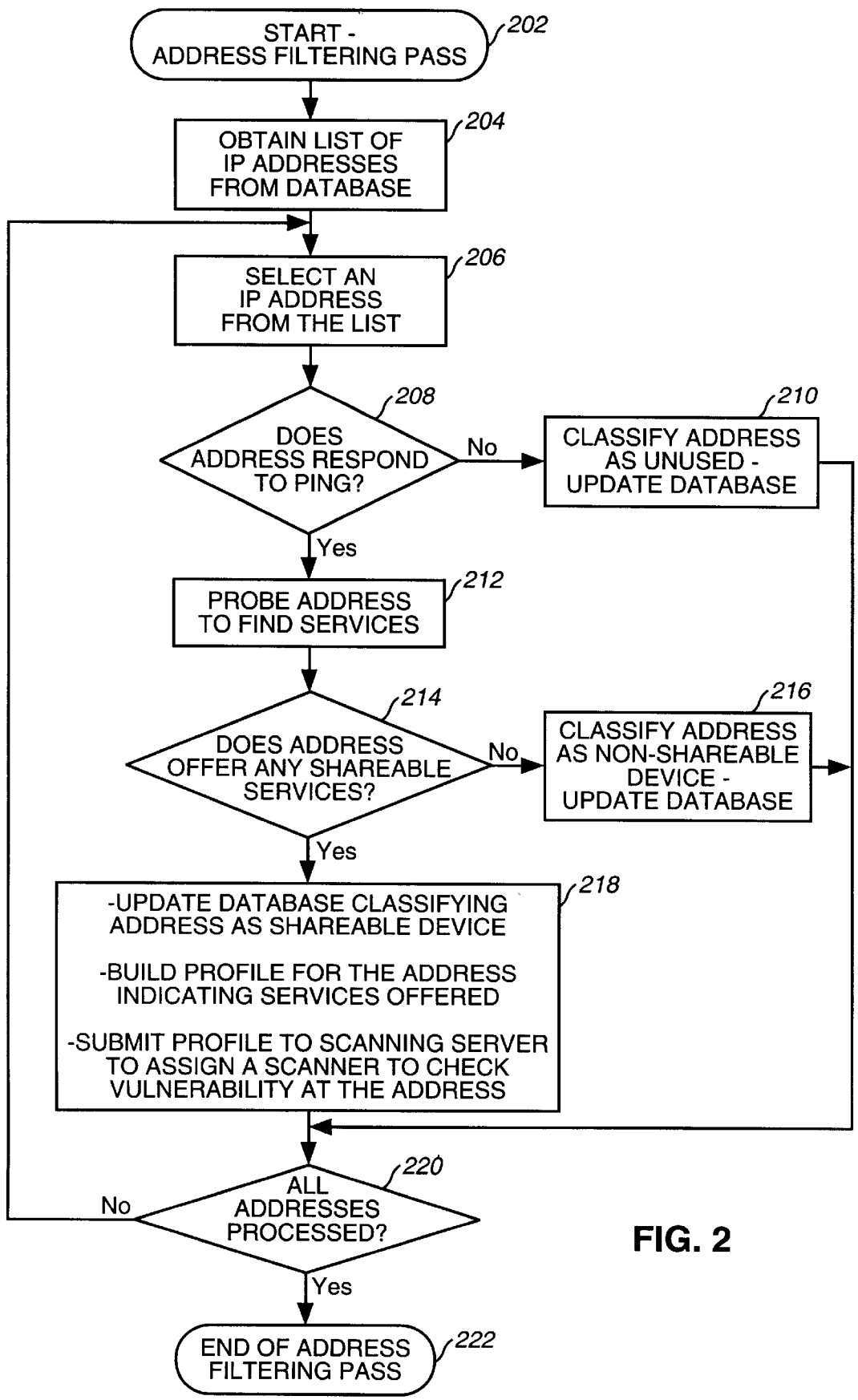
FIG. 2 is a flowchart describing a process for selecting and profiling network addresses as candidates for in-depth vulnerability testing.

FIG. 2 details the steps by which the address filtering process 124 sorts through addresses for network 100 and finds candidate addresses for selective vulnerability testing. In FIG. 2, step 202 represents the start of a single filtering pass through all the addresses in network 100 as listed in address database 130. This process may be initiated by a user through interface 121 or by a pre-programmed or time-triggered event, for example.

In step 204, the address filtering process 124 obtains the addresses from address database 130.

Step 206 involves selecting one of the addresses in the list as a context for steps 208–218.

In step 208, the address filtering process 124 causes a low-level echo return command, commonly known as a "ping", to be issued to the address under test. Normally, with any sort of device attached to the port being addressed, this would result in an immediate echo response that would be detected by the address filtering process 124. If no such response is received in step 208, then in step 210 the address is designated as unused and the address database 130 is updated accordingly. Following this, execution proceeds to step 220 whereupon the process ends or resumes at step 206 depending upon whether all addresses have been filtered.

If, in step 208, a response is received, then further queries are sent to the address attempting to exercise services such as FTP, TELNET, SMTP, SNMP, WWW, netBIOS, and the like.

In step 214, if the address does not respond as a server, then in step 216 the address is simply designated as belonging to a non-shareable device and the address database 130 is updated accordingly. Following this, execution proceeds to step 220 whereupon the process ends or resumes at step 206 depending upon whether all addresses have been filtered.

Upon any response to a query affirming that the address offers at least one service, then in step 218 the address is designated as corresponding to a shareable device and address database 130 is updated accordingly. Furthermore, a profile is created and stored in scan log 152 listing all of the services that were detected in step 212 for the particular address. It is contemplated that either the mere presence of a new profile or a separate notification mechanism can be used to trigger the vulnerability scanner 160 to act upon a profile in scan log 152.

Figure 3:
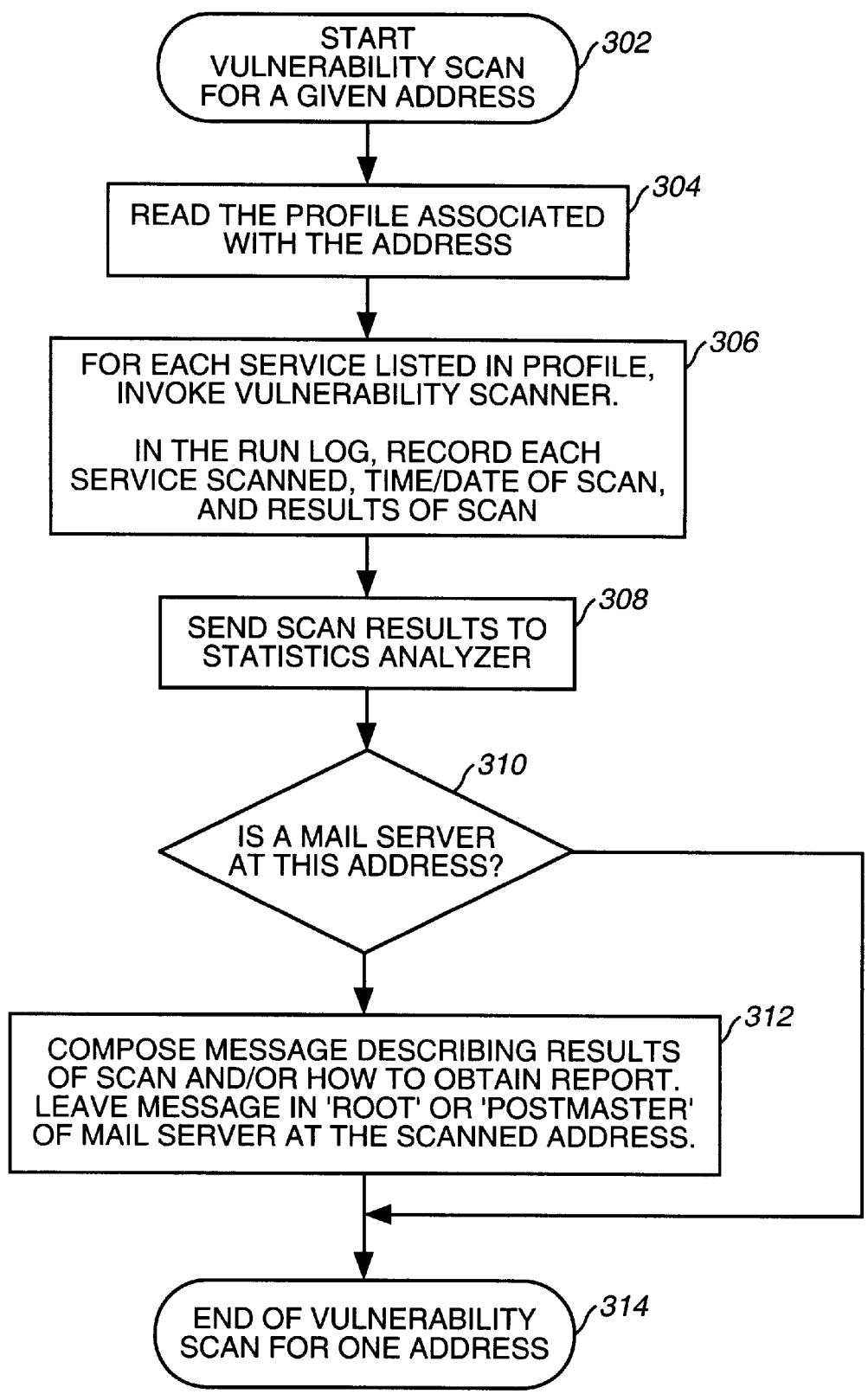
FIG. 3 is a flowchart describing a process for performing vulnerability scanning upon a given address and reporting the results.

FIG. 3 describes the steps performed by the vulnerability scan server 160 upon each address profile qualified by the address filtering process 124 during a filtering pass. Step 302 represents the start of a vulnerability scan upon one address with one associated profile.

Step 304 simply obtains and reads a profile for an address. Step 206 involves selecting and launching a scanning process for each service listed in the profile. As scan results are received from the various scanning processes, run log 150 accumulates a record of the findings along with a time/date of the scans. Upon conclusion of all scans, execution proceeds to step 308 wherein scan results are sent to statistics analyzer 170 (optional).

Steps 310 and 312 provide for a message to be deposited directly into the "mailbox" of a mail server to notify the administrator of the mail server that a scan was performed and how to obtain the results. The process of scanning a particular address is concluded in step 314.

In a preferred embodiment of the present invention, some element of the invention such as the exposure analysis processor 120 creates a periodic report summarizing the progress and results of scanning network 100. This report can be issued on an hourly, daily, weekly, or monthly schedule and can take the form of display on user interface 121, printed output on a printer, or electronic mail.

Those skilled in the relevant art will recognize that many variations upon the above are possible without affecting the spirit and scope of the present invention. For example, the address filtering process and vulnerability scanner may certainly be combined to run within the same processor concurrently or even be integrated as a single process. Otherwise, the address filtering process and vulnerability scan server may communicate with one another through the network to which they are both inherently attached.

Variations in application are equally possible. For example, the present invention may be applied to accessing modems scattered about a large telephone network. By calling numbers and looking for specific handshaking signals, the present invention can inventory non-modem versus fax-modem versus server modems and then target more extensive scanning tools at the latter group of numbers.

While the present invention has been shown and described above in an example embodiment, the invention is not intended to be limited by the foregoing discussion but instead be defined by the following claims.

What is claimed is:

1. A data network, comprising:
    a plurality of devices connected to a data network, wherein each of said devices correspond to a unique address in a range of addresses;
    an exposure analysis processor connected to said data network that determines a classification of each of said unique addresses in said range of addresses, wherein the classification is one in a group of classifications consisting of unused addresses, non-sharable device addresses and shareable device addresses; and
    a vulnerability scanner connected to said data network for selectively scanning only those addresses classified as shareable device addresses by said exposure analysis processor.

2. The data network of claim 1, wherein said exposure analysis processor determines whether an address is classified as a shareable device address by determining a presence of one or more types of service interfaces at such address.

3. The data network of claim 2, wherein said exposure analysis processor determines the one or more types of service interfaces at each shareable device address.

4. The data network of claim 1, wherein said vulnerability scanner scans each shareable device address in response to the one or more types of service interfaces determined to be present by said exposure analysis processor at such shareable device address.

5. The data network of claim 4, further comprising:
    a run log database which stores a record corresponding to each shareable device address, wherein the record includes results of scanning of the one or more types of service interfaces at the shareable device address.

6. The data network of claim 5, further comprising:
    a statistics analyzer that receives the results of scanning of the shareable device addresses and analyzes said results.

7. The data network of claim 6, further comprising:
    an address database connected to said exposure analysis processor which stores the classification determined by said exposure analysis processor for each unique address in the range of possible addresses.

8. The data network of claim 7, wherein said range of addresses is a range of Internet Protocol addresses.

9. A method of scanning for vulnerabilities of a plurality of devices in a data network, wherein each device corresponds to a unique address in a range of addresses, the method comprising the steps of:
    classifying each of the unique addresses in the range of addresses corresponding to the plurality of devices in the data network, including classifying each address as an unused address, a non-shareable device address or as a shareable device address;
    identifying which of said plurality of devices are shareable devices are shareable devices; and selectively scanning those derives which are identified as shareable devices for vulnerabilities.

10. The method of claim 9, further including the steps of:
    identifying types of services offered by each device; and
    scanning for vulnerabilities in each type of service identified.

11. The method of claim 9, wherein the said step of classifying each of the unique addresses in the range of addresses comprises the steps of:
    selecting a first address in said range of addresses;
    issuing a low-level echo command to said first address;
    determining whether an echo response is received; and
    designating the first address as unused in response to determining that no echo response is received and designating that a device is present at the first address in response to determining that an echo response is received.

12. The method of claim 9, wherein said step of identifying which of said plurality of devices are shareable devices comprises the step of:
    determining a presence of one or more types of service interfaces at such device; and
    designating such device as a shareable device in response to determining the presence of at least one type of service interface.

13. The method of claim 12, further comprising the step of:
    scanning each shareable device address in response to the one or more types of service interfaces determined to be present by said exposure analysis processor at such shareable device address.

14. The method of claim 13, further comprising the step of:
    storing a record corresponding to each shareable device, wherein the record includes results of scanning of the one or more types of service interfaces at the shareable device.

15. The method of claim 14, further comprising the steps of:
    receiving a result from scanning of the shareable devices, analyzing the results; and
    generating a report of the results.

* * * * *